US012288932B2

(12) United States Patent
Hendry

(10) Patent No.: US 12,288,932 B2
(45) Date of Patent: Apr. 29, 2025

(54) ANTENNA ARRANGEMENT

(71) Applicant: NOKIA TECHNOLOGIES OY, Espoo (FI)

(72) Inventor: David Hendry, New Providence, NJ (US)

(73) Assignee: NOKIA TECHNOLOGIES OY, Espoo (FI)

(*) Notice: Subject to any disclaimer, the term of this patent is extended or adjusted under 35 U.S.C. 154(b) by 301 days.

(21) Appl. No.: 17/905,837

(22) PCT Filed: Mar. 5, 2021

(86) PCT No.: PCT/EP2021/055633
§ 371 (c)(1),
(2) Date: Sep. 8, 2022

(87) PCT Pub. No.: WO2021/180590
PCT Pub. Date: Sep. 16, 2021

(65) Prior Publication Data

US 2023/0121837 A1 Apr. 20, 2023

(30) Foreign Application Priority Data

Mar. 9, 2020 (FI) ..................................... 20205247

(51) Int. Cl.
*H01Q 13/10* (2006.01)
*H01Q 9/16* (2006.01)
*H01Q 21/26* (2006.01)

(52) U.S. Cl.
CPC ............. *H01Q 13/106* (2013.01); *H01Q 9/16* (2013.01); *H01Q 21/26* (2013.01)

(58) Field of Classification Search
CPC ........ H01Q 13/106; H01Q 13/18; H01Q 9/16; H01Q 9/045; H01Q 21/26; H01Q 21/24; H01Q 1/36; H01Q 1/38
See application file for complete search history.

(56) References Cited

U.S. PATENT DOCUMENTS 4,644,343 A * 2/1987 Schneider .......... H01Q 21/0043 343/771
5,633,645 A 5/1997 Day
9,995,712 B2 6/2018 Moulds
10,361,485 B2 * 7/2019 Isom .................... H01Q 25/001
2004/0189527 A1 9/2004 Killen et al.
(Continued)

FOREIGN PATENT DOCUMENTS

CN 203660055 U 6/2014
CN 203733942 U 7/2014
(Continued)

OTHER PUBLICATIONS

Zhang, et. al., "An Integrated Diversity Antenna Based on Dual-Feed Cavity-Backed Slot," IEEE Antennas and Wireless Propagation Letters, vol. 13, 2014 (Year: 2014).*
(Continued)

*Primary Examiner* — Seokjin Kim
(74) *Attorney, Agent, or Firm* — ALSTON & BIRD LLP

(57) ABSTRACT

An antenna arrangement comprising: a conductive element comprising three slots radially extending from a common center void; and a first feed and a second feed wherein the first feed is a single line feed and the second feed is a single line feed.

19 Claims, 3 Drawing Sheets

(56) References Cited

U.S. PATENT DOCUMENTS

| | | | | |
|---|---|---|---|---|
| 2009/0195469 | A1* | 8/2009 | Lim | H01Q 13/10 343/770 |
| 2009/0213013 | A1 | 8/2009 | Lindmark et al. | |
| 2010/0141532 | A1 | 6/2010 | Uddin et al. | |
| 2010/0289701 | A1 | 11/2010 | DeJean et al. | |
| 2013/0063310 | A1 | 3/2013 | Mak et al. | |
| 2015/0042513 | A1 | 2/2015 | Foo | |
| 2016/0164182 | A1 | 6/2016 | Lai et al. | |
| 2017/0207542 | A1* | 7/2017 | Tseng | H01Q 1/48 |
| 2018/0351244 | A1* | 12/2018 | McAuliffe | H04B 1/40 |
| 2019/0044234 | A1* | 2/2019 | Isom | H01Q 21/0006 |

FOREIGN PATENT DOCUMENTS

| | | | |
|---|---|---|---|
| CN | 109037923 | A | 12/2018 |
| EP | 0447218 | A2 | 9/1991 |
| EP | 1444753 | A2 | 8/2004 |
| EP | 3 379 650 | A1 | 9/2018 |
| WO | WO 03/028156 | | 4/2003 |
| WO | WO 2018/233224 | A1 | 12/2018 |

OTHER PUBLICATIONS

International Search Report and Written Opinion for Patent Cooperation Treaty Application No. PCT/EP2021/055633 dated Jun. 9, 2021, 15 pages.

Mishra et al., "Wideband Cylindrical Dielectric Resonator Antenna with Different Feeding Techniques at X-Band Frequency", The IUP Journal of Telecommunications, vol. VII, No. 4, Nov. 2015, pp. 28-37.

Office Action for Finland U.S. Appl. No. 20/205,247 dated Nov. 17, 2020, 8 pages.

Zhang et al., "An Integrated Diversity Antenna Based on Dual-Feed Cavity-Backed Slot", IEEE Antennas and Wireless Propagation Letters, vol. 13, (Feb. 11, 2014), 4 pages.

Office Action for Chinese Application No. 202180020093.2 dated Oct. 23, 2024, 12 pages.

* cited by examiner

ANTENNA ARRANGEMENT

CROSS-REFERENCE TO RELATED APPLICATIONS

This application is a national phase entry of International Application No. PCT/EP2021/055633, filed Mar. 5, 2021, which claims priority to Finnish Application No. 20205247, filed Mar. 9, 2020, the contents of which are hereby incorporated by reference in their entirety.

TECHNOLOGICAL FIELD

Embodiments of the present disclosure relate to an antenna arrangement.

BACKGROUND

An antenna arrangement is an apparatus that by itself or in combination with another component or components can be used as a radio frequency antenna for efficiently transmitting and/or receiving far field electromagnetic waves.

Antennas are resonant structures and can be difficult to design because they often need to have particular performance characteristics in an operational resonant frequency band (e.g. reflection coefficients, efficiency, directivity, polarization, insertion loss, isolation between feeds, interference across other operational resonant frequency bands) and also be of a reduced size.

Dual-linear polarized antennas can simultaneously operate within the same operational resonant frequency band but with two orthogonal linear polarizations. This creates two independent communication channels-one for each polarization.

BRIEF SUMMARY

According to various, but not necessarily all, embodiments there is provided an antenna arrangement comprising:

- a conductive element comprising three slots radially extending from a common center void; and
- a first single line feed and a second single line feed.

In some but not necessarily all examples, the first feed and the second feed are not overlapping.

In some but not necessarily all examples, the first feed is a straight line feed and the second feed is a curved or straight line feed.

In some but not necessarily all examples, each feed is a half resonant wavelength resonator.

In some but not necessarily all examples, the conductive element comprises:

- a first section that is between a first one of the slots and a second one of the slots,
- a second section that is between the second one of the slots and the third one of the slots, and
- a third section that is between the third one of the slots and the first one of the slots, wherein the first feed bi-sects the first section and overlaps a part of the third one of the slots.

In some but not necessarily all examples, the second feed extends over second section and third section but not the first section, and extends over the third one of the slots.

In some but not necessarily all examples, the antenna arrangement is configured to support a first dipole mode associated with the first feed and a second dipole mode associated with the second feed that provide orthogonal polarizations in the far field, wherein in the first dipole mode the second section is in-phase compared to the third section, and the first section is anti-phase compared to the first and second sections, and wherein in the second dipole mode the second section is anti-phase compared to the third section.

In some but not necessarily all examples, the slots are equally spaced.

In some but not necessarily all examples, the slots have same shape.

In some but not necessarily all examples, the slots have 120° rotational symmetry about the center void.

In some but not necessarily all examples, each slot is elongate extending lengthwise from the common center void and comprises at least one laterally extending lateral slot, wherein the slot has a length greater than a width and wherein the lateral slots have a width greater than a length.

In some but not necessarily all examples, each of the three slots has a lateral slot and the three lateral slots are curved.

In some but not necessarily all examples, each of the three slots has a lateral slot and the three lateral slots lie on a circle. In some but not necessarily all examples, the second feed has same curvature as the lateral slots.

In some but not necessarily all examples, the slots have an electrical length of half wavelength.

In some but not necessarily all examples, the antenna arrangement further comprises an antenna radiator.

According to various, but not necessarily all, embodiments there is provided examples as claimed in the appended claims.

BRIEF DESCRIPTION

Some example embodiments will now be described with reference to the accompanying drawings in which.

DETAILED DESCRIPTION

The following FIGS. illustrate examples of an antenna arrangement 10 comprising: a conductive element 20 comprising three slots 22 radially extending from a common center void 24; and a first single line feed $\mathbf{30}_1$ and a second single line feed $\mathbf{30}_2$.

The first feed $\mathbf{30}_1$ is a single line feed in that it does not bifurcate or fork. The second feed $\mathbf{30}_2$ is a single line feed in that it does not bifurcate or fork.

The three slots 22 include a first slot $\mathbf{22}_1$, a second slot $\mathbf{22}_2$, and a third slot $\mathbf{22}_3$.

The antenna arrangement 10 can have good isolation between feeds $\mathbf{30}_1$, $\mathbf{30}_2$ and the three-slot arrangement provides good spurious performance that does not contaminate adjacent operational frequency bands.

Figure 1A:
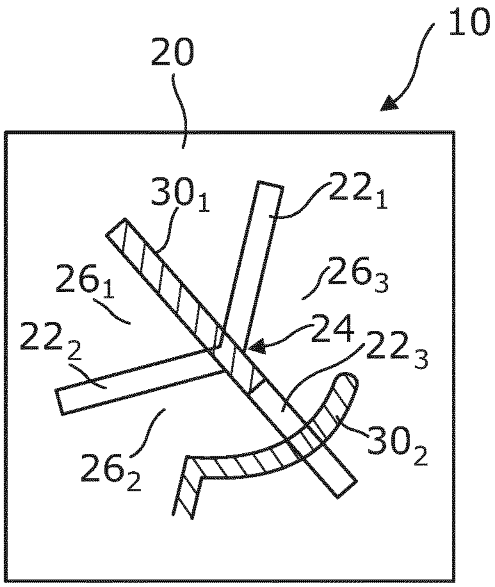
FIG. 1A shows an example embodiment of the subject matter described herein.
Figure 1C:
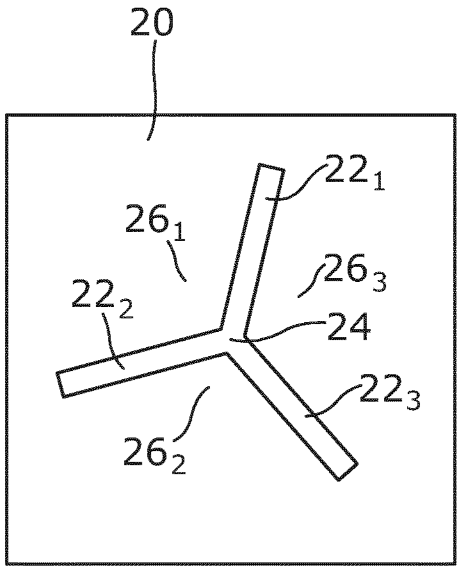
FIG. 1C shows an example embodiment of the subject matter described herein.
Figure 1B:
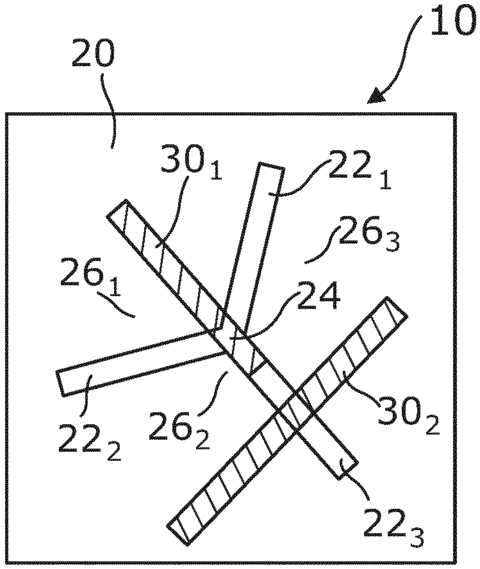
FIG. 1B shows an example embodiment of the subject matter described herein.

FIGS. 1A and 1B illustrate examples of the antenna arrangement 10. These antenna arrangements 10 comprise a conductive element 20 comprising three slots 22 radially extending from a common center void 24, a first single line feed $\mathbf{30}_1$ and a second single line feed $\mathbf{30}_2$.

FIG. 10 illustrates the conductive element 20 comprising the three slots 22 without illustrating the first single line feed $\mathbf{30}_1$ and the second single line feed $\mathbf{30}_2$.

In the examples illustrated in FIGS. 1A, 1B and 10 the slots 22 are equally spaced. In the examples illustrated the slots 22 have the same shape. In the examples illustrated the slots 22 have 120° rotational symmetry about the center void 24. Each slot 22 is elongate extending lengthwise, in an outward radial direction from the common center void 24. In these examples, the slots 22 have a constant width along all or a substantial portion of their length. The slots 22 are through-apertures in the conductive element 20, that is they are apertures that extend all the way through the conductive element 20.

The first feed $\mathbf{30}_1$ and the second feed $\mathbf{30}_2$ are not overlapping. This improves isolation between the feeds 30.

In these examples, but not necessarily all example, the first feed $\mathbf{30}_1$ is a straight line feed.

In the example illustrated in FIG. 1A, the second feed $\mathbf{30}_2$ is a curved line feed. In the example illustrated in FIG. 1B, the second feed $\mathbf{30}_2$ is a straight line feed. In these examples, but not necessarily all example, each feed 30 is a half resonant wavelength resonator. For example, the curved portion of the second feed $\mathbf{30}_2$ in FIG. 1A has a length that is substantially equal to half of a resonant wavelength of the antenna arrangement 10. A resonant wavelength is the wavelength equivalent to an operational resonant frequency of the antenna arrangement 10.

In the examples illustrated, the first feed $\mathbf{30}_1$ and the second feed $\mathbf{30}_2$ are on same side of the conductive element 20. However, in other examples the first feed $\mathbf{30}_1$ and the second feed $\mathbf{30}_2$ can be on opposite sides of the conductive element 20.

The feeds 30 can, for example, be formed as a conductive stripline or microstrip.

The conductive element 20 comprises a first section $\mathbf{26}_1$, a second section $\mathbf{26}_2$ and a third section $\mathbf{26}_3$. The first section $\mathbf{26}_1$ is between the first slot $\mathbf{22}_1$ and the second slot $\mathbf{22}_2$. The second section $\mathbf{26}_2$ is between the second slot $\mathbf{22}_2$ and the third slot $\mathbf{22}_3$. The third section $\mathbf{26}_3$ is between the third slot $\mathbf{22}_3$ and the first slot $\mathbf{22}_1$.

In the examples illustrated, the first feed $\mathbf{30}_1$ bi-sects the first section $\mathbf{26}_1$ and overlaps the void 24 and a part of the third slot $\mathbf{22}_3$. The second feed $\mathbf{30}_2$ extends over part of the second section $\mathbf{26}_2$ and part of the third section $\mathbf{26}_3$ but not any part of the first section $\mathbf{26}_1$, and extends over the third slot $\mathbf{22}_3$.

Figure 2A:
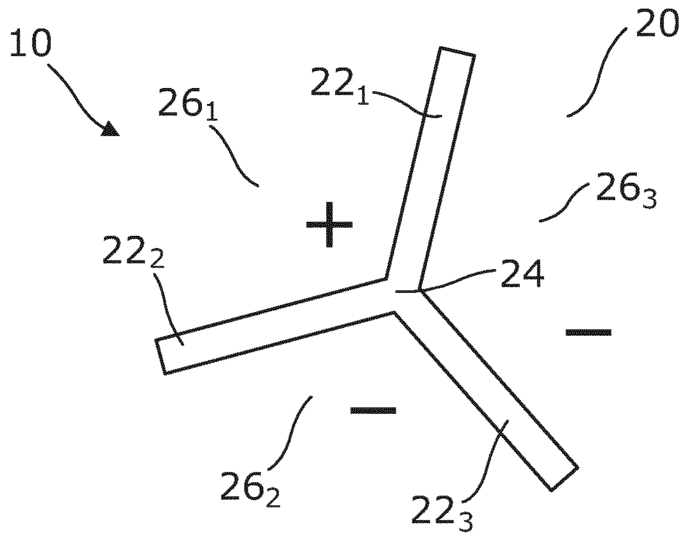
FIGS. 2A and 2B show another example embodiment of the subject matter described herein.
Figure 2B:
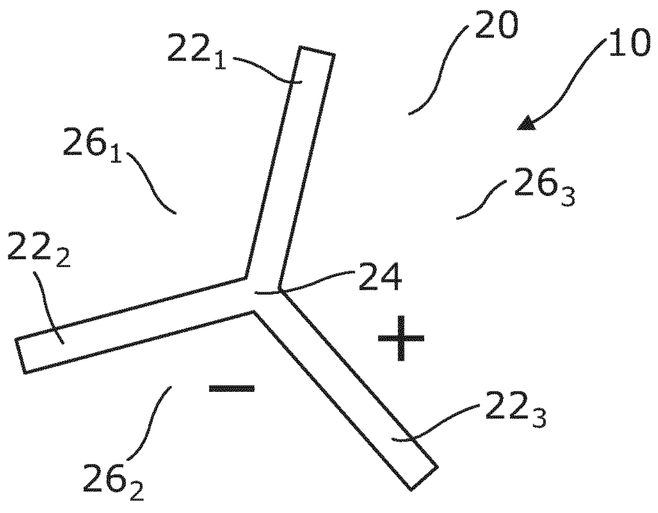

As illustrated in FIGS. 2A, 2B, the antenna arrangement 10 is configured to support a first dipole mode (FIG. 2A) and a second dipole mode (FIG. 2B). The antenna arrangement 10 in FIGS. 2A, 2B corresponds to that illustrated in FIG. 1A or 1B. FIGS. 2A, 2B illustrate the conductive element 20 comprising the three slots 22 and do not illustrate the first feed $\mathbf{30}_1$ or the second feed $\mathbf{30}_2$ for clarity of illustration.

The first dipole mode (FIG. 2A) is associated with the first feed $\mathbf{30}_1$ in that the first feed $\mathbf{30}_1$ couples strongly with a first dipole mode and operates as a first dipole mode feed. The second dipole mode (FIG. 2B) is associated with the second feed $\mathbf{30}_2$ in that the second feed $\mathbf{30}_2$ couples strongly with a second dipole mode and operates as a second dipole mode feed. There is good isolation between the first dipole mode and the second dipole mode. There is good isolation between the first feed $\mathbf{30}_1$ and the second feed $\mathbf{30}_2$. The first feed $\mathbf{30}_1$ and the second feed $\mathbf{30}_2$ do not substantially couple at or near the operational resonant frequency band of the antenna arrangement 10.

The first dipole mode (FIG. 2A) and the second dipole mode (FIG. 2B) provide orthogonal polarizations in the far field.

In the first dipole mode (FIG. 2A), the second section $\mathbf{26}_2$ is in-phase (phase difference 0) compared to the third section $\mathbf{26}_3$, and the first section $\mathbf{26}_1$ is anti-phase (phase difference+π) compared to the second and third sections $\mathbf{26}_2$, $\mathbf{26}_3$. The second section $\mathbf{26}_2$ and the third section $\mathbf{26}_3$ have a phase of a first sense ($-\pi/2$) and the first section $\mathbf{26}_1$ has a phase of an opposite sense ($+\pi/2$) at this time.

In the second dipole mode (FIG. 2B), the second section $\mathbf{26}_2$ is anti-phase (phase difference+π) compared to the third section $\mathbf{26}_3$. The second section $\mathbf{26}_2$ has of a first sense ($-\pi/2$) and the third section $\mathbf{26}_3$ has phase of an opposite sense ($+\pi/2$) at this time.

The feeds 30 can be arranged to maximize isolation of the dipole modes.

The antenna arrangement 10 is a dual-linear polarized antenna arrangement that can simultaneously operate within the same operational resonant frequency band with two orthogonal linear polarizations. This creates two independent communication channels-one for each polarization.

Figure 3:
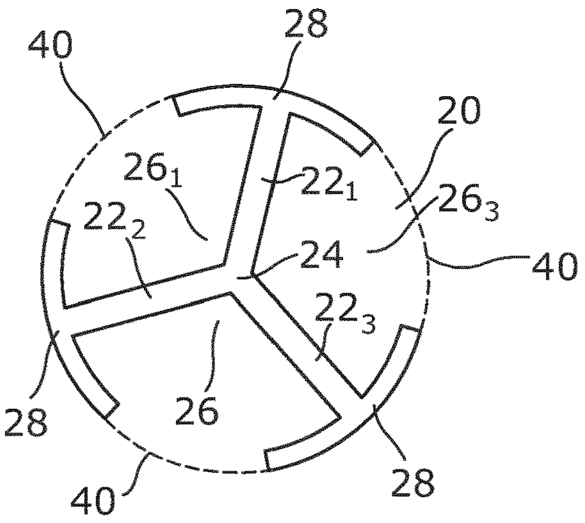
FIG. 3 shows an example embodiment of the subject matter described herein.

FIG. 3 illustrates an example of an antenna arrangement 10 as previously described. However, in this example the slots 22 have a different shape. As before, each slot 22 is elongate extending lengthwise, in an outward radial direction, from the common center void 24. Each slot 22 is elongate in that it has a length greater than a width.

In this example, but not necessarily all examples, each slot 22 comprises at least one laterally extending lateral slot 28. The lateral slots 28 have a circumferential width greater than a radial length. Each lateral slot 28 is bisected by an elongate slot 22. In the example illustrated, but not necessarily all examples, each lateral slot 28 is at end point (terminus) of an elongate slot 22 and the slot 22,28 as a whole, forms a 'T' shape. In the example illustrated, but not necessarily all examples, each lateral slot 28 is curved. In other examples, the lateral slots 28 can comprise a straight slot angled to create a perfect T or two straights slots angled to give an arrow shape. Other shapes are also possible.

In the illustrated example, each lateral slot 28 extends in a circumferential direction orthogonal to the radial direction. In the example illustrated, but not necessarily all examples, each curved lateral slot 28 lies on a circle 40 and has substantially the same radius of curvature as the second feed $\mathbf{30}_2$.

Figure 4:
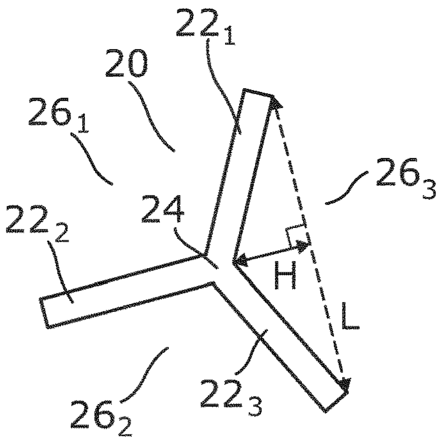
FIG. 4 shows an example embodiment of the subject matter described herein.

FIG. 4 illustrates an example in which the slots 22 in the conductive element 20 have a length L and the sections 26 have a height H. Applying simple trigonometry, L*cos 60°=H i.e. L=2H. The length L is, in this example, one half of the resonant wavelength (λ/2). The height H is one quarter of the resonant wavelength (λ/4).

In the preceding examples, but not necessarily all examples, the conductive element 20 is a flat planar conductive element 20.

In the preceding examples, but not necessarily all examples, the conductive element 20 is configured to have a defined stable electric potential, that is it is a ground, also known as a ground plane.

Figure 5:
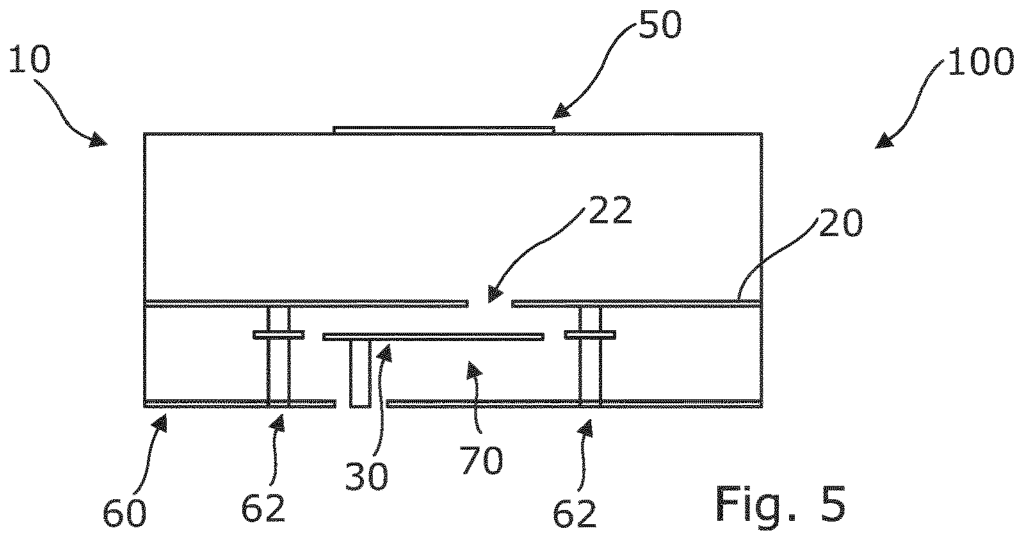
FIG. 5 shows an example embodiment of the subject matter described herein.

FIG. 5 illustrates an example of an antenna arrangement 10 as previously described in cross-sectional side view. In this example the antenna arrangement 10 comprises an antenna radiator 50. The antenna radiator 50 can be an electrically conductive antenna radiator or a dielectric antenna radiator.

Figure 6:
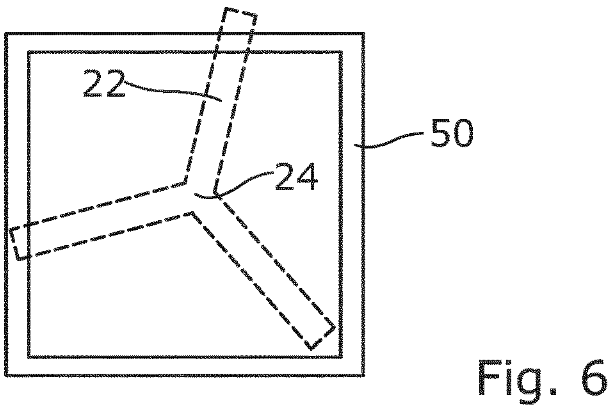
FIG. 6 shows an example embodiment of the subject matter described herein.

FIG. 6 illustrates an example of an antenna radiator 50 from a top plan view. The slots 22 and central void are illustrated using dotted lines. In this example, the radiator 50 is centrally positioned overlying the void 24 and all or a significant proportion of the slots 22 in the conductive element 20.

The radiator 50 can be 360/N degree rotationally symmetric, where N>2, to support dual polarization, at the same frequency. Otherwise, the radiator 50 can be any suitable shape-solid planar shape or ring shape. The radiator 50 could be circular (ring or solid planar)

In some but not necessarily all examples the radiator 50 has a ring shape.

It can for example be a rectangular ring with a rectangular inner and outer perimeter. It can for example be a square ring, as illustrated with a square inner and outer perimeter. In this example a width of the ring between perimeters is constant and similar to the constant width of the slots 22.

Referring back to FIG. 5, none, one or both feeds 30 can be located between the radiator 50 and the conductive element 20. Alternatively the conductive element 20 can be located between the radiator 50 and none, one or both feeds 30.

In this illustrated example, but not necessarily all examples, the conductive element 20 is positioned between the radiator 50 and a ground plane 60. The ground plane 60 is galvanically interconnected to the conductive element 20. The conductive element 20 is therefore grounded.

In this example, but not necessarily all examples, conductive walls 62 extend upwardly between the ground plane 60 and the conductive element 20 forming a cavity 70 between the ground plane 60, the conductive walls 62 and the conductive element 20. The conductive walls 62 can in some examples completely surround the cavity 70.

The antenna element 50 is centrally located over the cavity 70. The void 24 (not illustrated) can be centrally located relative to the cavity 70.

The feed or feeds 30 can enter the cavity 70 either through a side wall 62 or through the ground plane 60.

The feeds 30 can couple to the radiator 50 through the slots 22 in the grounded, planar conductive element 20.

The antenna arrangement 10 can be comprised in another apparatus or system 100.

For example, the antenna arrangement 10 can have one antenna element in a multiple input multiple output (MIMO) antenna array or in a massive multiple input multiple output (mMIMO) antenna array. Each antenna element in the array can be an antenna arrangement 10 as described. In this example, the ground pane 60 can be shared between some or all of the antenna elements of the array. In this example, the conductive element 20 can be shared between some or all of the antenna elements of the array.

For example, the antenna arrangement 10 or antenna arrangements, whether or not part of an antenna array, can be used in a radio frequency transmitter apparatus, a radio frequency receiver apparatus, or a radio frequency transceiver apparatus. Such an apparatus can, in some examples, be configured to operate in a cellular telecommunications network as a network node (e.g. base station, node B, small cell, macro cell, micro cell, etc) or as a mobile node (e.g. smartphone, mobile cellular telephone, mobile equipment, user equipment, laptop, tablet, vehicle, etc).

The antenna arrangement 10 may be configured to operate in one or a plurality of operational resonant frequency bands. For example, the one or more operational frequency bands may include (but are not limited to) Long Term Evolution (LTE) (US) (734 to 746 MHz and 869 to 894 MHz), Long Term Evolution (LTE) (rest of the world) (791 to 821 MHz and 925 to 960 MHz), amplitude modulation (AM) radio (0.535-1.705 MHz); frequency modulation (FM) radio (76-108 MHz); Bluetooth (2400-2483.5 MHz); wireless local area network (WLAN) (2400-2483.5 MHz); hiper local area network (HiperLAN) (5150-5850 MHz); global positioning system (GPS) (1570.42-1580.42 MHz); US— Global system for mobile communications (US-GSM) 850 (824-894 MHz) and 1900 (1850-1990 MHz); European global system for mobile communications (EGSM) 900 (880-960 MHz) and 1800 (1710-1880 MHz); European wideband code division multiple access (EU-WCDMA) 900 (880-960 MHz); personal communications network (PCN/DCS) 1800 (1710-1880 MHz); US wideband code division multiple access (US-WCDMA) 1700 (transmit: 1710 to 1755 MHz, receive: 2110 to 2155 MHz) and 1900 (1850-1990 MHz); wideband code division multiple access (WCDMA) 2100 (transmit: 1920-1980 MHz, receive: 2110-2180 MHz); personal communications service (PCS) 1900 (1850-1990 MHz); time division synchronous code division multiple access (TD-SCDMA) (1900 MHz to 1920 MHz, 2010 MHz to 2025 MHz), ultra wideband (UWB) Lower (3100-4900 MHz); UWB Upper (6000-10600 MHz); digital video broadcasting-handheld (DVB-H) (470-702 MHz); DVB-H US (1670-1675 MHz); digital radio mondiale (DRM) (0.15-30 MHz); worldwide interoperability for microwave access (WiMax) (2300-2400 MHz, 2305-2360 MHz, 2496-2690 MHz, 3300-3400 MHz, 3400-3800 MHz, 5250-5875 MHz); digital audio broadcasting (DAB) (174.928-239.2 MHz, 1452.96-1490.62 MHz); radio frequency identification low frequency (RFID LF) (0.125-0.134 MHz); radio frequency identification high frequency (RFID HF) (13.56-13.56 MHz); radio frequency identification ultra high frequency (RFID UHF) (433 MHz, 865-956 MHz, 2450 MHz), frequency allocations for 5G may include e.g. 700 MHz, 3.6-3.8 GHz, 24.25-27.5 GHz, 31.8-33.4 GHz, 37.45-43.5, 66-71 GHz, mmWave, and >24 GHz).

An operational resonant mode (operational bandwidth) is a frequency range over which an antenna can efficiently operate. A frequency band over which an antenna can efficiently operate is a frequency range where the antenna's return loss is less than an operational threshold. For example, efficient operation may occur when the antenna's return loss is better than (that is, less than)−4 dB or −6 dB in a mobile transceiver, or better than −10 dB or −15 dB in a network node.

Where a structural feature has been described, it may be replaced by means for performing one or more of the functions of the structural feature whether that function or those functions are explicitly or implicitly described.

As used here 'module' refers to a unit or apparatus that excludes certain parts/components that would be added by an end manufacturer or a user. The antenna arrangement 10 can be a module.

The above described examples find application as enabling components of:

automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'antenna feed arrangement' can be used to describe an antenna arrangement that does not yet comprise an antenna radiator (50). The term 'fed antenna arrangement' can be used to describe an antenna arrangement that does comprise an antenna radiator (50).

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. An antenna arrangement comprising:
- a conductive element comprising a first slot, a second slot and a third slot, radially extending from a common center void; and
- a first feed and a second feed wherein the first feed is a single line feed and the second feed is a single line feed,
- wherein the first feed bi-sects a section between the first slot and the second slot and overlaps part of the third slot, and
- wherein the second feed extends over the third slot without extending over the section between the first slot and the second slot.

2. An antenna arrangement as claimed in claim 1, wherein the first feed and the second feed are not overlapping.

3. An antenna arrangement as claimed in claim 1, wherein the first feed is a straight line feed and the second feed is a curved or straight line feed.

4. An antenna arrangement as claimed in claim 1, wherein each feed is a half resonant wavelength resonator.

5. An antenna arrangement as claimed in claim 1, wherein the conductive element comprises:
- a first section that is the section between the first slot and the second slot,
- a second section that is between the second slot and the third slot, and
- a third section that is between the third slot and the first slot.

6. An antenna arrangement as claimed in claim 5, wherein the second feed extends over the second section and the third section but not the first section.

7. An antenna arrangement as claimed in claim 5, configured to support a first dipole mode associated with the first feed and a second dipole mode associated with the second feed that provide orthogonal polarizations in the far field,
- wherein in the first dipole mode the second section is in-phase compared to the third section, and the first section is anti-phase compared to the first and second sections, and
- wherein in the second dipole mode the second section is anti-phase compared to the third section.

8. An antenna arrangement as claimed in claim 1, wherein the first, second, and third slots are equally spaced.

9. An antenna arrangement as claimed in claim 1, wherein the first, second, and third slots have a same shape.

10. An antenna arrangement as claimed in claim 1, wherein the first, second, and third slots have a 120° rotational symmetry about the center void.

11. An antenna arrangement as claimed in claim 1, wherein respective ones of the first, second, and third slots are elongate extending lengthwise from the common center void and comprises at least one laterally extending lateral slot, wherein the respective ones of the first, second, and third slots have a length greater than a width and wherein the lateral slots have a width greater than a length.

12. An antenna arrangement as claimed in claim 1, wherein respective ones of the first, second, and third slots comprise a lateral slot and the three lateral slots are curved.

13. An antenna arrangement as claimed in claim 1, wherein respective ones of the first, second, and third slots comprise a lateral slot and the three lateral slots lie on a circle.

14. An antenna arrangement as claimed in claim 13, wherein the second feed has same curvature as the lateral slots.

15. An antenna arrangement as claimed in claim 1, wherein the first, second, and third slots have an electrical length of a half wavelength.

16. An antenna arrangement as claimed in claim 1, further comprising an antenna radiator.

17. A radio frequency transceiver apparatus comprising the antenna arrangement as claimed in claim 1.

18. A network node comprising the antenna arrangement as claimed in claim 1.

19. A mobile node comprising the antenna arrangement as claimed in claim 1.

* * * * *